Jan. 12, 1960 J. GOLDBERG ET AL 2,920,820

TEN'S COMPLEMENT CIRCUIT

Filed Dec. 24, 1956

JACOB GOLDBERG
BONNAR COX
WILLIAM H. KAUTZ
MILTON B. ADAMS
INVENTORS

BY Lyon & Lyon

ATTORNEYS 2,920,820

TEN'S COMPLEMENT CIRCUIT

Jacob Goldberg, Bonnar Cox, and William H. Kautz, Palo Alto, and Milton B. Adams, Sunnyvale, Calif., assignors, by mesne assignments, to General Electric Company, New York, N.Y., a corporation of New York Application December 24, 1956, Serial No. 630,145

3 Claims. (Cl. 235—159)

This invention relates to information-handling machines and, more particularly, to an improved arrangement for providing the ten's complement of numbers.

In the course of their operation, present-day electronic information-handling machines, or data-processing machines, have occasion to handle negative numbers. In order to render these numbers very distinctive, especially on printout from the machine, it is desirable to convert them to their ten's complement. By the ten's complement of a number is meant the difference between a number and ten raised to a power equal to the number of digits in said number. By way of example, the ten's complement of 7 is 3, of 398 is 602. By extending the power of one digit, the ten's complement will always be preceded by a nine and thus be easily identified. Thus in the above examples, the ten's complements are 93 and 9602. Ten's complementing also permits subtraction by addition, thus eliminating the need for subtract circuits. In order to obtain the ten's complement of a number, it has heretofore been the practice to perform the operation of subtraction. Although this operation is not difficult, the circuitry required is rather expensive, since arithmetic units employed in information-handling machines are rather complex. Time-sharing of the arithmetic unit which is usually present in the information-handling machine may be employed so that when it is not being used for other strictly mathematical operations it can be used for ten's complementing accrued negative numbers. This is not too desirable an arrangement, since it requires programming a storage system of some type and then switching apparatus when time is available. However, along with the extensive apparatus required in this type of an arrangement, the tying up of the arithmetic unit holds up all other operations having need of it.

An object of the present invention is to provide a novel arrangement for ten's complementing numbers.

Another object of the present arrangement is to provide an inexpensive circuit arrangement for ten's complementing numbers.

Yet another object of the present invention is the provision of the unique and simple method and means for deriving the ten's complement of a number.

These and other objects of the present invention are achieved by an arrangement which takes advantage of a unique property of numbers which is evidenced when the ten's complement of these numbers is sought to be taken. Considering the ten's complement of a number digit by digit, the least-significant digit of the resultant ten's complement is the true ten's complement. All the other digits are actually the nine's complement of the original number. This is the case except where there are zeros present in the least-significant-digit positions of the original number. The first digit to the left of any zeros extending from and including the least-significant-digit position of a number will be the true ten's complement. The next digit to the left of that one and the others thereafter will be the nine's complements of the original number.

In order to illustrate what has been stated more clearly, let us examine, for example, the number 0152. Its ten's complement is 9848. The digit 8 is a true ten's complement of 2, but the digits 4 and 8 are the nine's complements of the digits 5 and 1 in the original number. Next consider the number 0520. The ten's complement of this number is 9480. The ten's complement of the zero is zero. The ten's complement of the 2 is 8, but the digit 4 is the nine's complement of the number 5 in the original number. Consider now the number 03070. Its ten's complement is 96930. As pointed out above, the 7 and 0 in the original number have as their ten's complement respectively 3 and 0, but the 3 and 0 in the original number in the ten's complement resultant are respectively a 6 and 9.

In the present invention, numbers are fed into the ten's-complementing circuit serially, least-significant digit first. The circuit contains both a ten's complementer and a nine's complementer. The circuit contains a switching arrangement and the least-significant digit will pass through the ten's complementer, which produces as its output the complement of that digit with respect to ten. The circuitry then switches to the nine's complementer, so that the remaining digits will pass through the nine's complementer, producing as an output the nine's complements of the remaining digits. A zero-sensing circuit is provided, which prevents the switching from the ten's to the nine's complementing circuits as long as zeros are continually sensed in the lesser significant digit positions. When zeros are no longer sensed, then the switching circuit is enabled to operate in the manner previously described.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
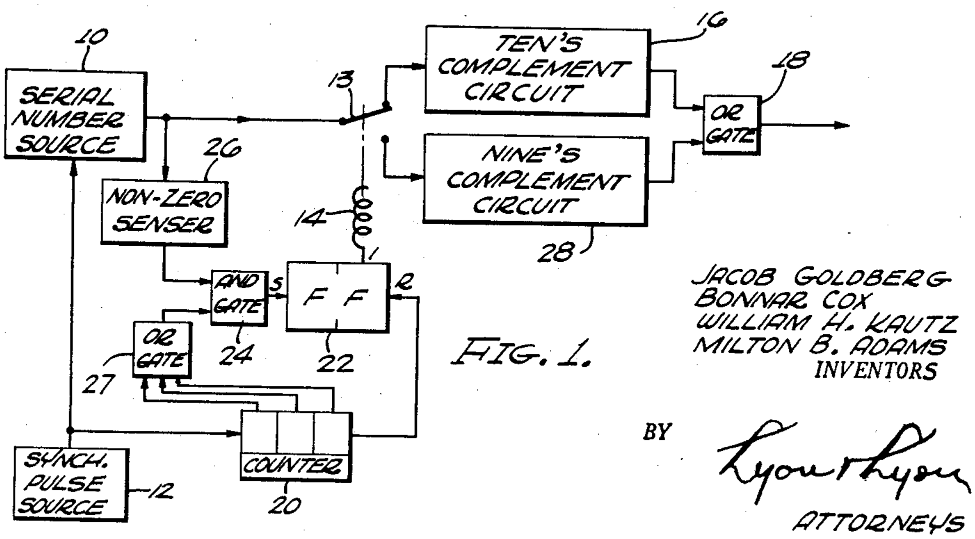
Figure 1 is a block diagram illustrating the principles of this invention.

Reference is now made to Figure 1, which is a block diagram illustrating the principles of the invention. This block diagram can be used for any number system in which numbers are represented in digital fashion electrically. For the purposes of explanation, let it be assumed that a binary decimal numbering system is employed, wherein each digit of a decimal number is represented in binary code. This requires that for each digit position of the decimal number there will be four binary digit positions. This is necessary in order that the numbers zero through nine be represented in binary fashion. Thus, for ease in explanation, four binary digits are called a digit—referring to the digit represented in decimal code—each binary digit is called a "bit," or binary digit.

A serial-number source 10 provides as its output in series the binary number signals representing the decimal number which is to be ten's complemented. These signals are emitted synchronized by pulses from a synchronizing pulse source 12. This is the usual source of clock pulses which is provided in an information-handling machine, either by a stable oscillator or by pulses recorded on a drum which are read continuously by some other suitable means. The technique of using synchronizing pulses, or clock pulses, as they are more commonly known, for timing the operation of electrical equipment is well known in the field.

The first one of the digits emitted from the serial-number source 10 passes through the normally closed contacts 13 of a relay 14 to a ten's complement circuit 16. The output of this ten's complement circuit is the ten's complement of the first decimal digit which is represented by four binary digits. The ten's complement is applied to an OR gate 18, or buffer, from whence it is supplied to the remainder of the system in which it is utilized.

The output from the sync pulse source 12 is also applied to a counter 20. This counter advances after each decimal digit in the number. Here the number of digits is three. At this time, the counter output is applied through an OR gate 27 and to an AND gate 24. Also applied to the OR gate 27 are counter outputs for each digit of the number. The output of the counter when it is filled is applied to reset a flip-flop circuit 22. This flip-flop circuit, when in its set condition, energizes the relay 14. When it is reset, the relay is deenergized.

The output from the serial-number source 10 is also applied to what may be called a "nonzero senser" circuit 26. This is merely circuitry which recognizes that the code does not represent a zero and provides an output indicative of that fact. The output of the nonzero senser is applied to AND gate 24 at the same time an output is received from the OR gate 27. The output of AND gate 24 sets the flip-flop 22 and energizes the relay 14. This causes the relay contacts 13 to connect the output of the serial-number source to a nine's complementer circuit 28. As long as a zero occurs, commencing with the least-significant digit of a number, the output of the arrangement shown in Figure 1 is the ten's complement of the digit. The first nonzero digit would still be ten's complemented, but the ones thereafter would be nine's complemented. At the end of its count, the counter resets the flip-flop 22 to ready the apparatus for the next number to be ten's complemented.

As pointed out above, Figure 1 is a block diagram illustrating the principles of the ten's complementer for any number system. To provide a specific illustration of the invention, the description that follows is that of a circuit which was built and operated satisfactorily. In the particular system in which the circuit was operated, the excess-three code was employed. As is well known, this excess-three code is a binary code in which zero is represented by three, or 0011 in regular binary code. One is represented by four, or 0100, in regular binary code, etc. The numbers from zero to nine in excess-three code are represented below:

| Decimal | Binary | | | | Excess-three | | | | Nine's Complement | | | | Ten's Complement | | | |
|---|---|---|---|---|---|---|---|---|---|---|---|---|---|---|---|---|
| | | | | | W | X | Y | Z | W | X | Y | Z | W | X | Y | Z |
| 0 | 0 | 0 | 0 | 0 | 0 | 0 | 1 | 1 | 1 | 1 | 0 | 0 | 0 | 0 | 1 | 1 |
| 1 | 0 | 0 | 0 | 1 | 0 | 1 | 0 | 0 | 1 | 0 | 1 | 1 | 1 | 1 | 0 | 0 |
| 2 | 0 | 0 | 1 | 0 | 0 | 1 | 0 | 1 | 1 | 0 | 1 | 0 | 1 | 0 | 1 | 1 |
| 3 | 0 | 0 | 1 | 1 | 0 | 1 | 1 | 0 | 1 | 0 | 0 | 1 | 1 | 0 | 1 | 0 |
| 4 | 0 | 1 | 0 | 0 | 0 | 1 | 1 | 1 | 1 | 0 | 0 | 0 | 1 | 0 | 0 | 1 |
| 5 | 0 | 1 | 0 | 1 | 1 | 0 | 0 | 0 | 0 | 1 | 1 | 1 | 1 | 0 | 0 | 0 |
| 6 | 0 | 1 | 1 | 0 | 1 | 0 | 0 | 1 | 0 | 1 | 1 | 0 | 0 | 1 | 1 | 1 |
| 7 | 0 | 1 | 1 | 1 | 1 | 0 | 1 | 0 | 0 | 1 | 0 | 1 | 0 | 1 | 1 | 0 |
| 8 | 1 | 0 | 0 | 0 | 1 | 0 | 1 | 1 | 0 | 1 | 0 | 0 | 0 | 1 | 0 | 1 |
| 9 | 1 | 0 | 0 | 1 | 1 | 1 | 0 | 0 | 0 | 0 | 1 | 1 | 0 | 1 | 0 | 0 |

The advantage of using the excess-three code is that by replacing ones with zeros and zeros with ones, the nine's complement of an excess-three code number is achieved. It should be noted that in the table shown above the letters W, X, Y, and Z are respectively applied to the bit positions in order of significance, most significant bit first.

This representation is used to enable a simple discussion of the various bit positions to be made without undue complexity. Studying the W and X bit positions, it will be seen that when a one occurs, in either the W or the X bit position, the number being represented by the excess-three code is not a zero. Thus, all that is necessary to sense zero is to sense that in the W or X bit positions there is not a one. Another point to note in the excess-three code is that the ten's complement of zero is zero.

Figure 2:
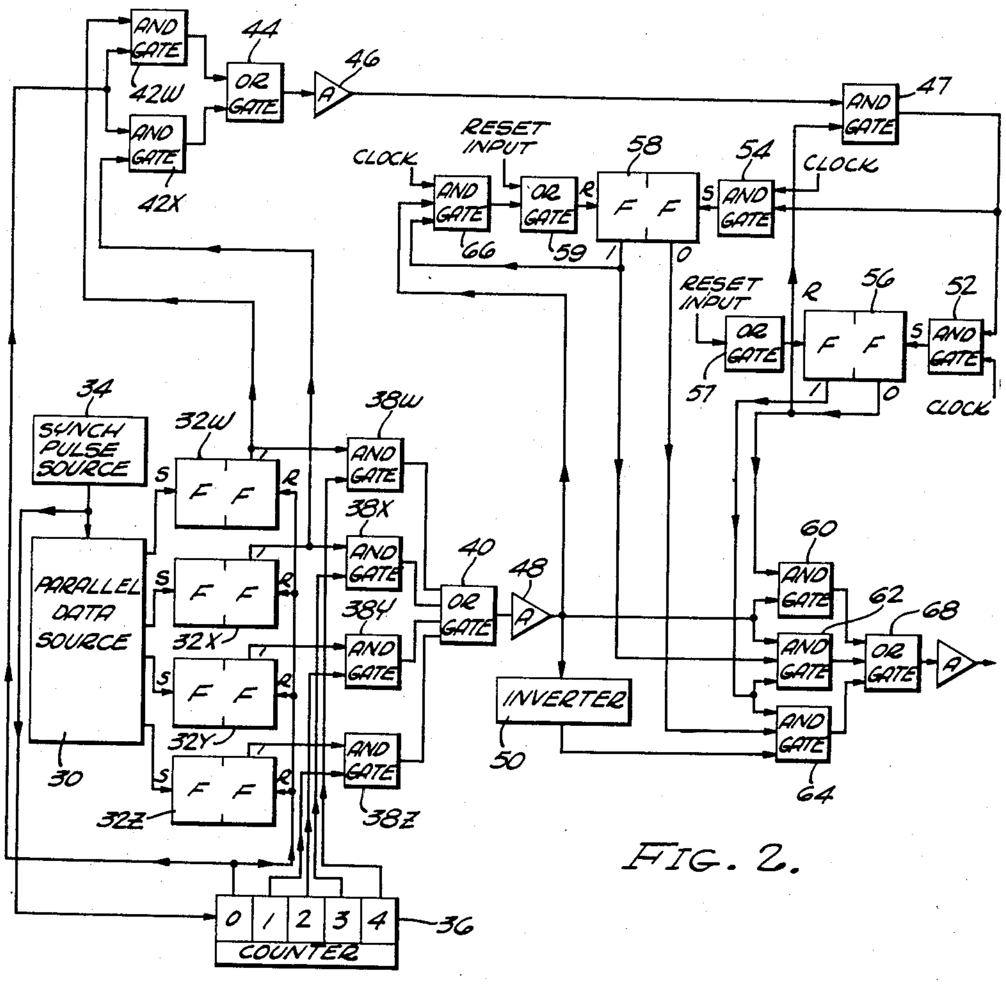
Figure 2 is a block diagram of an embodiment of this invention used to ten's complement excess-three binary-coded decimal numbers.

Now referring to Figure 2, which shows a block diagram of an embodiment of the invention as applied to the excess-three code, a parallel-data source 30 provides an output consisting of successive sets of four binary bits which represent a decimal number in excess-three code. Each four binary bits are applied to four flip-flop circuits, respectively designated at 32W, 32X, 32Y, and 32Z, to correspond to the four bits in the excess-three code. A synchronizing pulse source 34 provides the clock pulses to the parallel data source and also provides pulses to the counter 36. This counter is a four-bit ring counter, being returned to zero after it has counted the fourth pulse. A number from the parallel-data source will set or reset the flip-flops 32W through 32Z, depending on whether a zero or one is applied to the respective flip-flops. The counter, in response to output from the synchronizing pulse source, goes through its sequence of counts sequentially applying outputs to the respective AND gates 38W through 38Z. In this manner, these AND gates serialize the data which is staticized in the flip-flop circuits 32W through 32Z, since an output is or is not received from the AND gates, depending on whether the associated flip-flop circuit was or was not set as a result of a "one" or a "zero" signal having been applied from the parallel data source. The outputs from the AND gates are applied to an OR gate 40.

When counter 36 is reset to its zero condition, a pulse is applied to quiz or enable two AND gates 42W and 42X. These respectively are connected to the "one," or set, output sides of flip-flops 32W and 32X. Thus, either AND gate is enabled when there is a one in either or both of the W and X positions of a number. No outputs are received from these AND gates 42X and 42W when the W and X positions are zero, indicating that the number is a zero. The output of these AND gates is applied to an OR gate 44, and the output therefrom, designated as the "not zero" output, is applied to an amplifier 46.

The output of the OR gate 40 is applied to a cathode follower 48. The output of the cathode follower, which consists of the data which has been serialized, is also applied to an inverter 50. The output of the inverter 50 consists of serialized data in complementary form. Expressed another way, the inverter may be an amplifier or a trigger circuit which phase inverts the data so that when a zero signal is applied to the inverter input the output of the inverter corresponds to a "one" and when a one signal is applied to the inverter input, its output corresponds to a zero. The output of the amplifier 46, or not-zero output, is applied through a "new number" AND gate 47 to two AND gates 52, 54, which have as their second inputs pulses from the clock pulse source. The outputs from these AND gates are applied to set two flip-flops 56, 58. Flip-flop 56 enables AND gate 47 from its zero, or reset, side. Thus AND gate 47 remains enabled as long as flip-flop 56 remains reset. Flip-flops 56 and 58 remain reset as long as there are zeros. The zero, or reset, output of flip-flop 56 is also applied to an AND gate 60; the one, or set, output of flip-flop 56 is applied to two AND gates 62, 64. The zero output of flip-flop 58 is applied to AND gate 64; the one output of flip-flop 58 is applied to AND gate 62.

Let us consider now what happens when data is applied to the system. First, the flip-flops 32W through 32Z assume set or reset conditions corresponding to the ones and zeros of the number being applied thereto. An output is received from either AND gate 42W or 42X, or both, depending upon whether there are ones or not in the W and X bit positions of the number. Assume that there were ones in either or both positions. This will cause flip-flops 56 and 58 to be set. As counter 36 serializes the data which is staticized in the flip-flops 32W through 32Z, the data output of the cathode follower 48 is applied to AND gates 60 and 62. The output of the inverter 50 is applied to AND gate 64. It should also be noted that the output of the cathode follower 48 is also applied to an AND gate 66, which has as its other required inputs an output from the flip-flop 58 when in its one condition and a clock input. The output of this AND gate 66 is connected to reset the flip-flop 58. Flip-flop 58 will be reset by the first binary one appearing in the data. However, this one bit will pass through AND gate 62 before flip-flop 58 will be reset by it. Thus, either a zero or a one in the first binary bit position is enabled to pass through AND gate 62 to an OR gate 68 which provides its output to subsequent utilization apparatus. AND gate 64 is enabled when flip-flop-flop 58 is reset, since it is connected to receive the output of the zero side of flip-flop 58. Therefore, after the first one bit, the only output from OR gate 68 is the complement of input data. As previously shown in the excess-three code, this is the nine's complement.

By way of a specific example to better illustrate the operation of the apparatus, consider that the first number being applied is the number four in excess-three code. This is 0111. Its ten's complement is six, or 1001. A one digit is sensed in the X position, and therefore both flip-flops 56 and 58 are set. The least-significant binary digit is received first from the staticizing flip-flops 32W through 32Z. Thus, a one will be passed through AND gate 62 and OR gate 68. As described previously, succeeding binary digits in the output of OR gate 68 will be complements, since flip-flop 58 is reset, AND gate 62 is disenabled, and AND gate 64 is enabled. Thus, the Y digit of four is a zero. The X digit is a zero, and the W digit will be a one. The output of OR gate 68 is therefore 1001. This is the ten's complement of four.

Assume now that the next number appearing is the number eight, or 1011, for example. Since the first number has been sensed as not being zero, AND gate 47 is disenabled. There should now be provided as output from OR gate 68 the nine's complement of the number eight, which is one, or 0100. Since AND gate 64 remains enabled by the zero output of flip-flop 58, the number at the output of OR gate 68 will be the output of inverter 50, or the nine's complement of the input. Flip-flops 56, 58 are reset by a reset input only after the total number which is desired to be complemented has been processed. This can be done by a reset signal which may be received from a counter as shown in Figure 1. This signal is applied to two OR gates 57 and 59, which are coupled to the reset input sides of the flip-flops 56 and 58.

If the first binary digit number to be processed is zero, then the flip-flops 56 and 58 are not set, but remain in their reset condition. Under these circumstances, AND gate 60 is enabled from the zero output of flip-flop 56. Therefore, the data corresponding to the number zero in excess-three code can pass directly through AND gate 60 to OR gate 68. This can continue until a number is received which is not a zero; then the operation that occurs is identical to what has been described above.

The flip-flop circuits, AND gates, OR gates, and counters employed in the embodiment of the invention constitute well-known circuitry. Illustrations of circuitry which is suitable is found, for example, described and shown in the text Electronics, by Elmore and Sands, published by the McGraw-Hill Book Company in 1949. Gates, for example, are shown in pages 117–123; flip-flops and inverters are shown on pages 105–109.

Accordingly, there has been described and shown hereinabove a novel, useful, and simple arrangement for obtaining the ten's complement of a number.

We claim:

1. A circuit for providing the ten's complement of a number represented by electrical signals derived from a source, said number having one or more digits each being expressed in excess-three binary code, the electrical signals from said source representative of the digits and the binary bits of each digit being received serially, least-significant digit and bit first, said circuit comprising an input terminal to which said binary bit signals are applied, an inverter for generating signals representing the complement of the bits applied to said input terminal, a first and a second flip-flop circuit, each having a first and a second stable state and respectively having first and second outputs indicative thereof, an output terminal, first gate means to apply input from said input terminal to said output terminal responsive to a first output from said first flip-flop, second gate means to apply input from said input terminal to said output terminal responsive to second outputs from said first and second flip-flops, third gate means to apply output from said inverter to said output terminal responsive to second output from said first flip-flop and first output from said second flip-flop, means for driving said first and second flip-flops to their second stable states responsive to an incoming digit as represented by its signals not being a zero including means for enabling such operation only once for all signals representative of a number, and means for driving said second flip-flop to its first stable state responsive to the first "one" binary bit signal of said incoming digit at said input terminal.

2. A circuit for providing the ten's complement of a number represented by electrical signals derived from a source, said number having one or more digits each being expressed in excess-three binary code, the electrical signals from said source representative of the digits and the binary bits of each digit being received serially, least-significant digit and bit first, said circuit comprising an input terminal to which signals representative of said binary bits are applied, an inverter for generating signals representative of the complement of the signals representative of the bits applied to said input terminal, a first and a second flip-flop circuit, each having a first and a second stable state and respectively having first and second outputs indicative thereof, first, second and third coincidence gates each requiring a simultaneous presence of its inputs to provide an output, an output terminal to which all said coincidence-gate outputs are coupled, said first coincidence gate having its inputs respectively coupled to said first flip-flop first output and to said input terminal, said second coincidence gate having its inputs respectively coupled to said first and second flip-flop second outputs and said input terminal, said third coincidence gate having its inputs respectively coupled to said first flip-flop second output, said second flip-flop first output and to the output of said inverter, means for driving said first and second flip-flops to their second stable states responsive to an incoming digit as represented by its signals not being a zero, including means for enabling such operation only once for signals representative of a number, and means for driving said second flip-flop to its first stable state responsive to the first "one" binary bit signal of said incoming signals representative of a digit at said input terminal.

3. A circuit as recited in claim 2 wherein said means for driving said first and second flip-flops to their second stable states responsive to an incoming digit as represented by its signals not being a zero includes means to provide a nonzero output signal responsive to the presence of a one binary bit signal in the third or fourth least-significant positions of a digit, and said means for enabling such operation only once for a number includes a fourth coincidence gate having its output coupled to said first flip-flop for driving it to its second condition and its inputs respectively coupled to said means to provide a nonzero output and to the first output of said first flip-flop.

References Cited in the file of this patent

UNITED STATES PATENTS 2,799,450 Johnson ---------------- July 16, 1957

OTHER REFERENCES

Blankenbaker: "How Computers Do Arithmetic," Control Engineering, April 1956, pages 95 and 97 relied on.